United States Patent
Tamura

(10) Patent No.: US 9,319,271 B2
(45) Date of Patent: Apr. 19, 2016

(54) MANAGEMENT DEVICE AND MANAGEMENT METHOD

(71) Applicant: FUJITSU LIMITED, Kawasaki-shi, Kanagawa (JP)

(72) Inventor: Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 13/778,759

(22) Filed: Feb. 27, 2013

(65) Prior Publication Data

US 2013/0170397 A1 Jul. 4, 2013

Related U.S. Application Data

(63) Continuation of application No. PCT/JP2010/064965, filed on Sep. 1, 2010.

(51) Int. Cl.
*H04L 12/28* (2006.01)
*H04L 12/24* (2006.01)
*H04L 12/26* (2006.01)

(52) U.S. Cl.
CPC ........ *H04L 41/0803* (2013.01); *H04L 41/0233* (2013.01); *H04L 41/5058* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 2004/0004949 A1* | 1/2004 | Cayla et al. | 370/338 |
| 2007/0177530 A1* | 8/2007 | Ando et al. | 370/277 |
| 2008/0235244 A1* | 9/2008 | Matsuo | 707/10 |
| 2009/0089300 A1 | 4/2009 | Vicente | |

FOREIGN PATENT DOCUMENTS

| | | |
|---|---|---|
| JP | 09-093265 | 4/1997 |
| JP | 2003-76659 | 3/2003 |
| JP | 2004-363745 | 12/2004 |
| JP | 2005-202461 | 7/2005 |
| JP | 2007-53452 | 3/2007 |
| JP | 2008-42665 | 2/2008 |
| JP | 2008-234563 | 10/2008 |
| JP | 2008-311715 | 12/2008 |
| JP | 2009-163710 | 7/2009 |

OTHER PUBLICATIONS

Japanese Office Action for corresponding Japanese Application 2012-531617; mailed Jul. 16, 2013.
International Search Report of Corresponding PCT Application PCT/JP2010/064965 mailed Oct. 19, 2010.

* cited by examiner

*Primary Examiner* — Afshawn Towfighi
(74) *Attorney, Agent, or Firm* — Staas & Halsey LLP

(57) ABSTRACT

A management device includes a memory and a processor coupled to the memory. The processor executes a process including, searching a network for a node that belongs to a management area to which the management device belongs, and creating management information in which the node searched for at the searching is used as a node that is targeted for management.

5 Claims, 10 Drawing Sheets

◎ DHT (DISTRIBUTED HASH TABLE) KEY (VM GUEST, STORAGE, SWITCH, ETC.)
● OPERATION MANAGEMENT PROGRAM NODE IN Domain 1 (SERVER, VM HOST)
◍ NODE IN Domain 2

FIG.7

DEFINITION OF DISTRIBUTED
HASH TABLE (DHT)

| HASHED BY USING Key (SHA-1) | Value |
|---|---|
| SERVER NAME | {server, SERVER NAME, key, {IP LIST}, {WWN LIST}, manager-flag, <br>　　{domain, DOMAIN NAME, key} <br>} |
| VM HOST NAME | { vmhost, VM HOST NAME, key, {IPLIST}, <br>　　{domain, DOMAIN NAME, key}, <br>　　{vmguest, {VM GUEST key LIST}} <br>} |
| VM GUEST NAME | {vmguest, VM GUEST NAME, key, {IP LIST}, <br>　　{vmhost, VM HOST NAME, key,} <br>} |
| SWITCH NAME | {switch, SWITCH NAME, key, {IP LIST}, <br>　　{domain, DOMAIN NAME, key} <br>} |
| STORAGE NAME | {storage, STORAGE NAME, key, {IP LIST}, {WWN LIST}, <br>　　{domain, DOMAIN NAME, key} <br>} |
| USER NAME | {user, USER NAME, key, <br>　　{group, {GROUP key LIST} <br>} |
| GROUP NAME | {group, GROUP NAME, key, <br>　　{user, {USER key LIST} <br>} |
| DOMAIN NAME | {domain, DOMAIN NAME, key, <br>　　{manager, {MANAGER key LIST} <br>} |

FIG.8

(1) Self Node Table

| TYPE | NODE NAME | Key | IP | WWN |
|---|---|---|---|---|
| vmhost | vmhost1.domain1.company.com | 100 | 10.20.30.40 | 10:00:00:60:69:00:23:74 |
| vmguest | vmguest11.domain1.company.com | 55 | 10.20.30.41 | null |
| vmguest | vmguest12.domain1.company.com | 70 | 10.20.30.42 | null |
| vmguest | vmguest13.domain1.company.com | 85 | 10.20.30.43 | null |
| vmguest | vmguest14.domain1.company.com | 90 | 10.20.30.44 | null |

FIG.9

(2) Domain Table

| TYPE | NODE NAME | Key | Manager Key |
|---|---|---|---|
| domain | domain1.company.com | 5 | 15, 100 |

FIG.10

(3) Node Table

| TYPE | NODE NAME | Key | Domain | Manager | Managed |
|---|---|---|---|---|---|
| vmhost | vmhost2.domain1.company.com | 1 | 5 | false | true |
| server | server1.domain1.company.com | 15 | 5 | true | true |
| server | server2.domain1.company.com | 20 | 5 | false | true |
| vmguest | vmguest11.domain1.company.com | 55 | 5 | false | true |
| server | server3.domain1.company.com | 66 | 5 | false | true |
| vmguest | vmguest12.domain1.company.com | 70 | 5 | false | true |
| vmhost | vmhost3.domain1.company.com | 75 | 5 | false | true |
| vmguest | vmguest13.domain1.company.com | 85 | 5 | false | true |
| vmguest | vmguest14.domain1.company.com | 90 | 5 | false | true |
| vmhost | vmhost1.domain1.company.com | 100 | 5 | true | true |
| switch | switch1.domain1.company.com | 110 | 5 | false | true |
| storage | storage1.domain1.company.com | 115 | 5 | false | true |
| vmguest | vmguest21.domain1.company.com | 120 | 5 | false | true |

FIG.11

(4) Routing Table (node of Key 100)

| distance | NODE NAME | Destination | Destination IP |
|---|---|---|---|
| 1 | vmhost1.domain1.company.com | 1 | a1.b1.c1.d1 |
| 2 | vmhost2.domain1.company.com | 1 | a1.b1.c1.d1 |
| 3 | vmhost2.domain1.company.com | 1 | a1.b1.c1.d1 |
| 5 | vmhost2.domain1.company.com | 1 | a1.b1.c1.d1 |
| 9 | vmhost2.domain1.company.com | 1 | a1.b1.c1.d1 |
| 17 | vmhost2.domain1.company.com | 1 | a1.b1.c1.d1 |
| 33 | node1.domain2.company.com | 4 | a4.b4.c4.d4 |
| 65 | node3.domain2.company.com | 36 | a36.b36.c36.d36 |

__US 9,319,271 B2__

MANAGEMENT DEVICE AND MANAGEMENT METHOD

CROSS-REFERENCE TO RELATED APPLICATION

This application is a continuation application of International Application PCT/JP2010/064965 filed on Sep. 1, 2010 and designating the U.S., the entire contents of which are incorporated herein by reference.

FIELD

The embodiment discussed herein is directed to a management device, a management program, and a management method for a network.

BACKGROUND

When large-scale network systems are managed, it is conventional to use a technology that hierarchizes the operation management managers used for operation management. An example of such management used in a large-scale system environment includes operation management of a distributed computer system, such as a large-scale data center.

Peer-to-peer communication is a known example of a network communication system. Furthermore, peer-to-peer communication is also used in overlay networks, which are networks built on top of existing networks. In an overlay network, there is a known technology that detects failures and updates the overlay network's routing table.

Patent Literature 1: Japanese Laid-open Patent Publication No. 2005-202461
Patent Literature 2: Japanese Laid-open Patent Publication No. 2007-053452
Patent Literature 3: Japanese Laid-open Patent Publication No. 2008-311715

If operation management managers are hierarchized in order to perform operation management on a network, such as a large-scale data center, there is a problem in that it takes a lot of time and effort to construct the configuration information and to configure the installation settings.

Typical methods used when constructing configuration information on an operation management manager include a method for automatically searching a network that is targeted for management and a method in which a configuration information definition file is additionally created and imported into a manager.

The method for automatically searching a network targeted for the management is a technology that uses a Packet Internet Groper (Ping) on an Internet Protocol (IP) address and collects information from the responding IP address by using, for example, Simple Network Management Protocol (SNMP) or Telnet. With this method, if there is a management target device having multiple IP addresses or a management target device that does not respond to a Ping, it is difficult to collect accurate information. Consequently, with this method, information that is obtained by automatic searching needs to be manually collected by a person.

The method in which a configuration information definition file is additionally created and then imported into a manager is a method in which the configuration information definition file is created assuming that the administrator handles all the configurations, which requires a lot of work.

SUMMARY

According to an aspect of the embodiment of the invention, a management device includes a memory and a processor coupled to the memory. The processor executes a process including: searching a network for a node that belongs to a management area to which the management device belongs; and creating management information in which the node searched for at the searching is used as a node that is targeted for management.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a table illustrating a specific example of a hash table definition.
FIG. 8 is a table illustrating a specific example of a self node table t2 illustrated in FIG. 2.
FIG. 9 is a table illustrating a specific example of a domain table t3 illustrated in FIG. 2.
FIG. 10 is a table illustrating a specific example of a node management table t4 illustrated in FIG. 2.
FIG. 11 is a table illustrating a specific example of a routing table t5 illustrated in FIG. 2.

DESCRIPTION OF EMBODIMENTS

A preferred embodiment of a management device, a management program, and a management method for a network according to the present invention will be described in detail below with reference to the accompanying drawings. The present invention is not limited to the embodiment.

Embodiment

Figure 1:
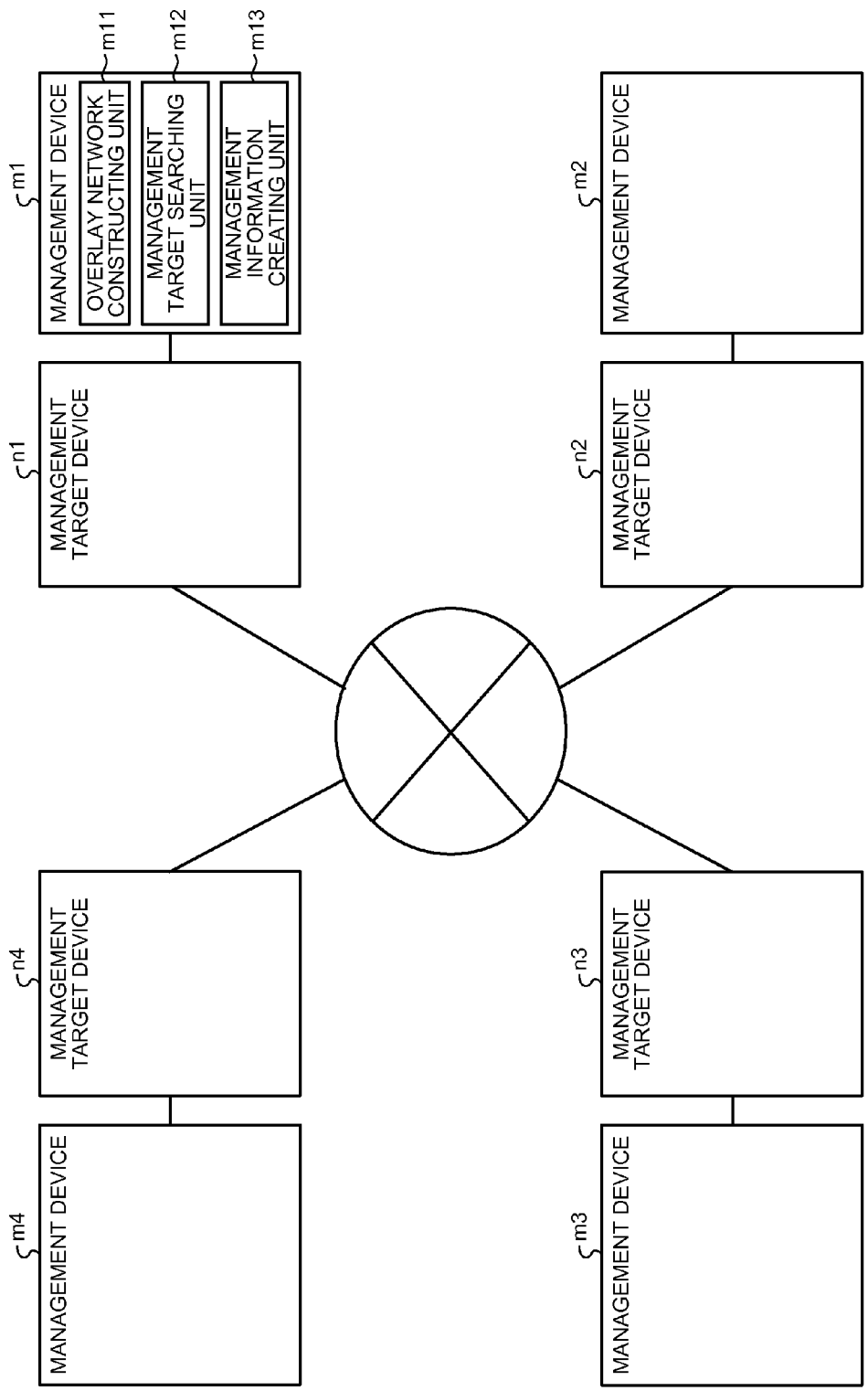
FIG. 1 is a schematic diagram illustrating a network according to an embodiment.
Figure 2:
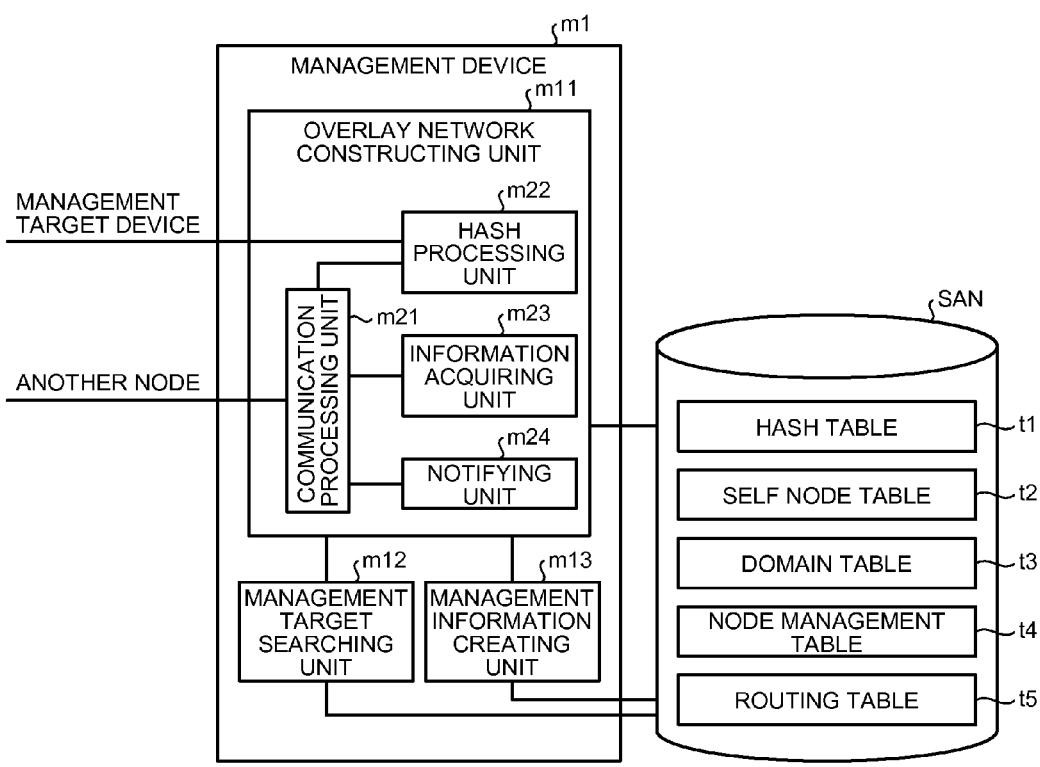
FIG. 2 is a schematic diagram illustrating the configuration of a management device according to the embodiment.

FIG. 1 is a schematic diagram illustrating a network according to an embodiment. FIG. 2 is a schematic diagram illustrating the configuration of a management device according to the embodiment. As illustrated in FIG. 1, management target devices n1 to n4 are connected via a network. This network corresponds to the network targeted for management.

A management device m1 is connected to the management target device n1, a management device m2 is connected to the management target device n2, and a management device m3 is connected to the management target device n3. By using network interfaces of the management target devices n1 to n4, the management devices m1 to m4 constructs an overlay network with respect to the network to which the management target devices n1 to n4 belong. The management devices m1 to m4 function as nodes of the overlay network and can communicate with each other.

The management devices m1 to m4 have the same configuration; therefore, a description will be given of the management device m1 as an example. The management device m1 includes an overlay network constructing unit m11, a management target searching unit m12, and a management information creating unit m13. Furthermore, the management device m1 is connected to a storage area network (SAN) and allows the SAN to retain various kinds of information, which will be described later.

The overlay network constructing unit m11 is a processing unit that constructs an overlay network with respect to the network targeted for management and includes a communication processing unit m21, a hash processing unit m22, an information acquiring unit m23, and a notifying unit m24.

The communication processing unit m21 performs a process for communicating with another node that is arranged in a network in which a management target device that is directly connected to a management device participates as a node. The hash processing unit m22 obtains a hash value from information that is acquired by the communication processing unit m21 from another node or from information on the management target device and uses the obtained hash value as a key for an overlay network. The information acquiring unit m23 is a processing unit that acquires information from another node in the overlay network via the communication processing unit m21. The notifying unit m24 is a processing unit that sends information as a notification to another node in the overlay network via the communication processing unit m21.

The management target searching unit m12 performs a process of searching the overlay network constructed by the overlay network constructing unit m11 for a node belonging in the same management area as that of the subject node of the management target device to which the management device m1 is directly connected.

The management information creating unit m13 creates management information in which the node searched for by the management target searching unit m12 is used as a node targeted for management.

The management device m1 is preferably used as a management program running on a computer that is the management target device. In the example illustrated in FIG. 3, three servers are included in each of a domain A and a domain B, each of which can communicate with the others.

In a server in the domain A, a virtual machine (VM) host program is run that virtually implements an operating environment of another computer system. Furthermore, four VM guest programs are running on the VM host program. Furthermore, in this server, an operation management program is also running on top of the VM host program. The operation management program running on the VM host program allows the server to function as a management device. The management target device managed by the operation management program corresponds to the server itself and the VM host program and the VM guest program running on the server.

Furthermore, in a server in the domain A, an operating system (OS) is running and an operation management program is running on the OS. A switch and a router are connected to this server. The operation management program running on the OS in the server allows the server to function as a management device. The management target device managed by the operation management program is a server itself and a switch and a router connected to the server.

Furthermore, in a server in the domain A, an operating system (OS) is running and an operation management program is running on the OS. Furthermore, storage is connected to the server. The operation management program running on the OS on the server allows the server to function as a management device. The management target device managed by this operation management program is the server itself and the storage that is connected to the server.

Similarly to the domain A, for each of the three servers included in the domain B, an operation management program is running on the VM host program or an OS on the server and allows each server to function as a management device. Accordingly, each server, various programs running on each server, and the hardware connected to each server are managed by the operation management program running on the corresponding server.

The operation management programs on the servers communicate with each other and construct an overlay network. Furthermore, the operation management program can collect information on another node in the domain to which its own device belongs and create management information. Furthermore, the operation management program can be acquired from a terminal accessible from both the domain A and the domain B.

Figure 3:
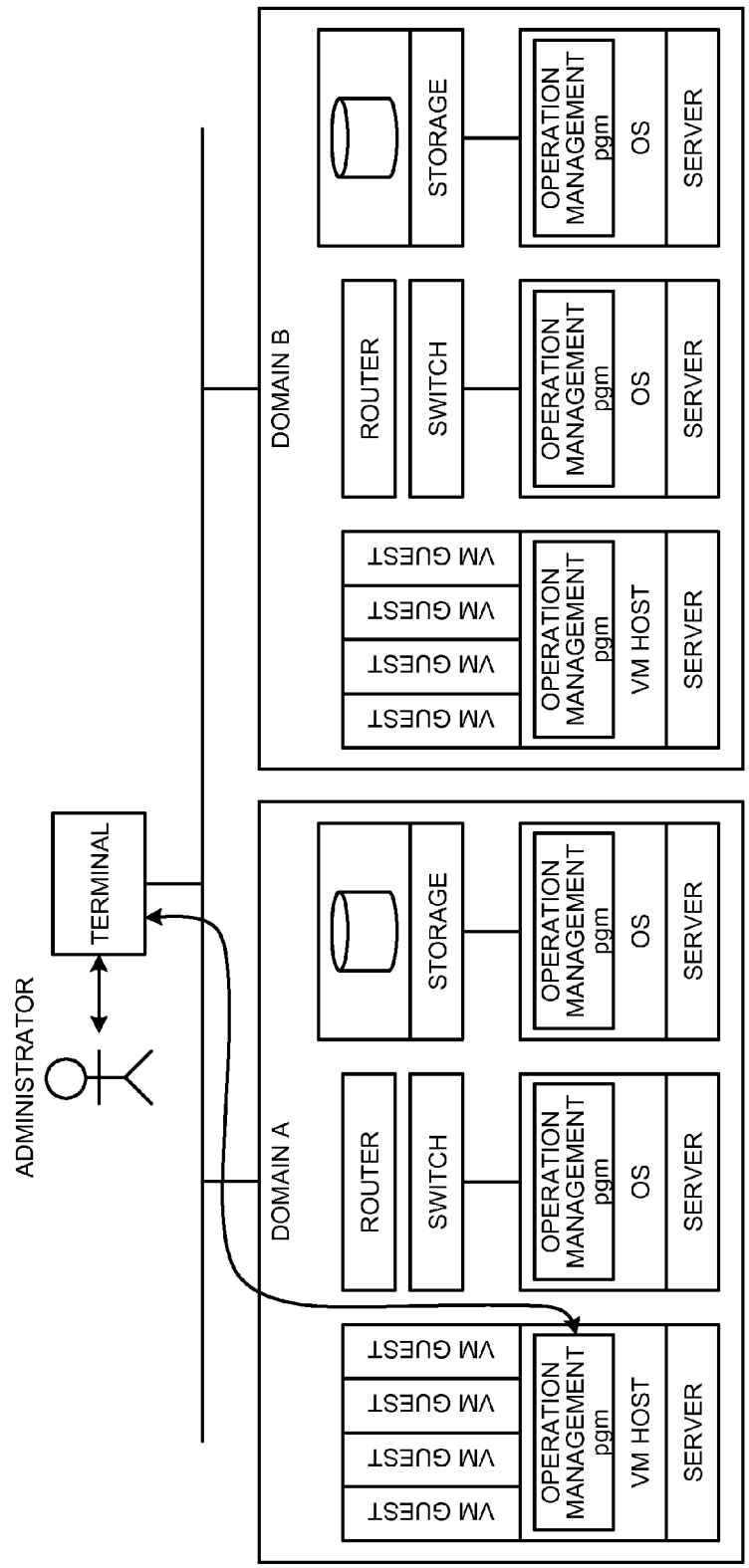
FIG. 3 is a schematic diagram illustrating a management program.
Figure 4:
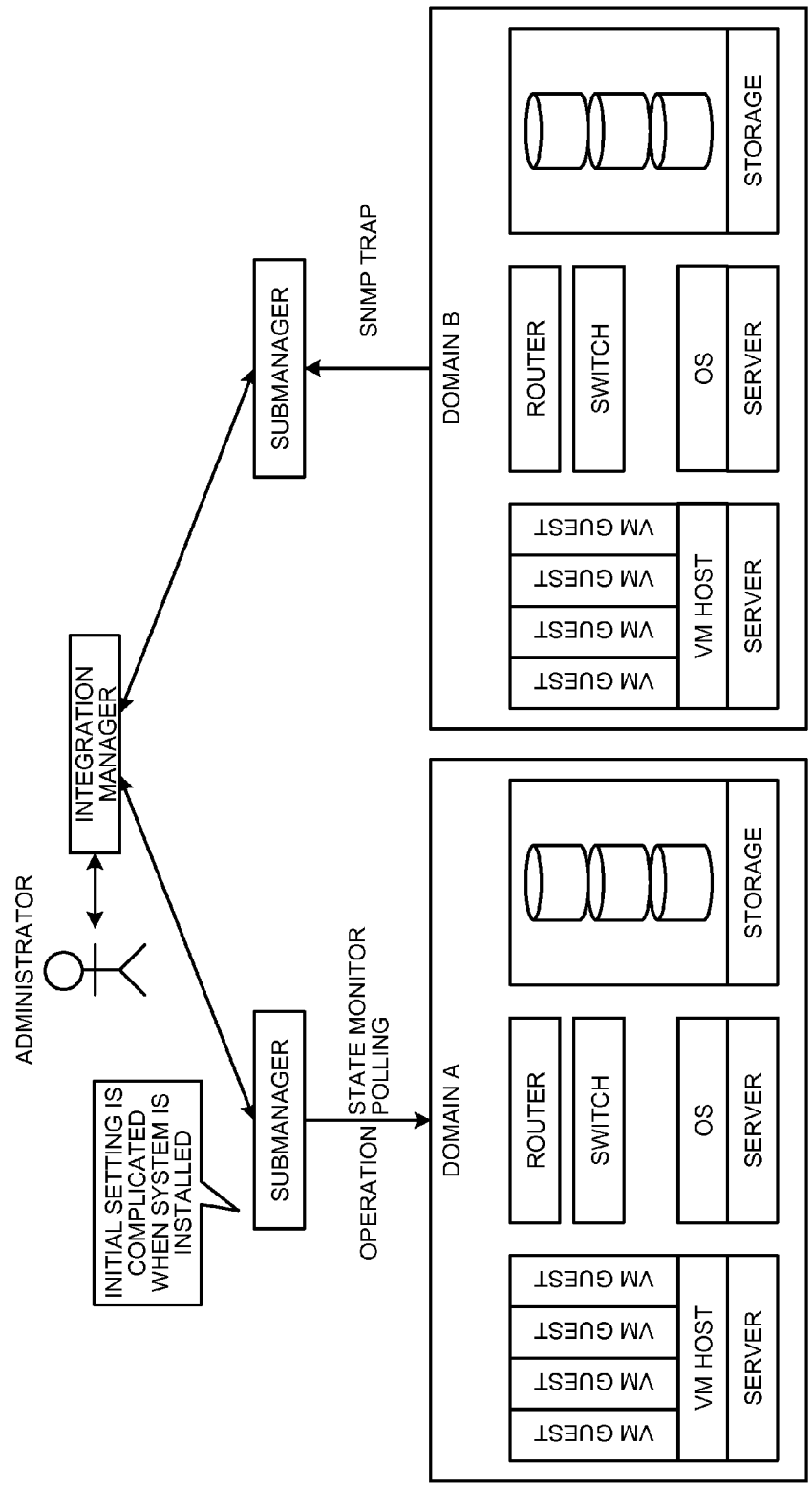
FIG. 4 is a schematic diagram illustrating hierarchical management.

As illustrated in FIG. 3, the operation management program can automatically acquire information on a node belonging to its own domain without hierarchicarizing management. FIG. 4 is a schematic diagram illustrating hierarchical management for comparison with FIG. 3.

In the system illustrated in FIG. 4, a submanager that manages the domain A and a submanager that manages the domain B are arranged and an integration manager manages these two submanagers.

A submanager performs state monitor polling on devices belonging to a domain handled by the submanager, acquires IP addresses of the devices, and collects, from the devices, information by using, for example, an SNMP trap that is performed on the acquired IP address.

As described above, when management is hierarchicarized, devices or programs that differ for each hierarchy need to be prepared. Furthermore, if the management hierarchical structure or the network configuration is changed, the management is revised in accordance with the change. Furthermore, because a device that has multiple IP addresses or a device that does not respond to a Ping may possibly be included in a network, an administrator has always needed to check when the management is installed or is revised.

However, with the management program illustrated in FIG. 3, the same programs are distributed to the servers; therefore, there is no need to distinguish between an integration manager program and a submanager program. Furthermore, the management program runs on all the devices targeted for management without distinguishing between an integration manager computer and a submanager computer. Consequently, when a new device targeted for management is added to the management program, the administrator does not need to change the configuration and thus the new device targeted for management can be automatically added.

If a new device targeted for management is added, a management program in the added device targeted for management automatically constructs configuration information and acquires, if another manager is present in the same domain, i.e., if a server on which the management program is running is present, configuration information from that manager. If not, the management program collects the configuration information by itself and constructs the configuration information.

Figure 5:
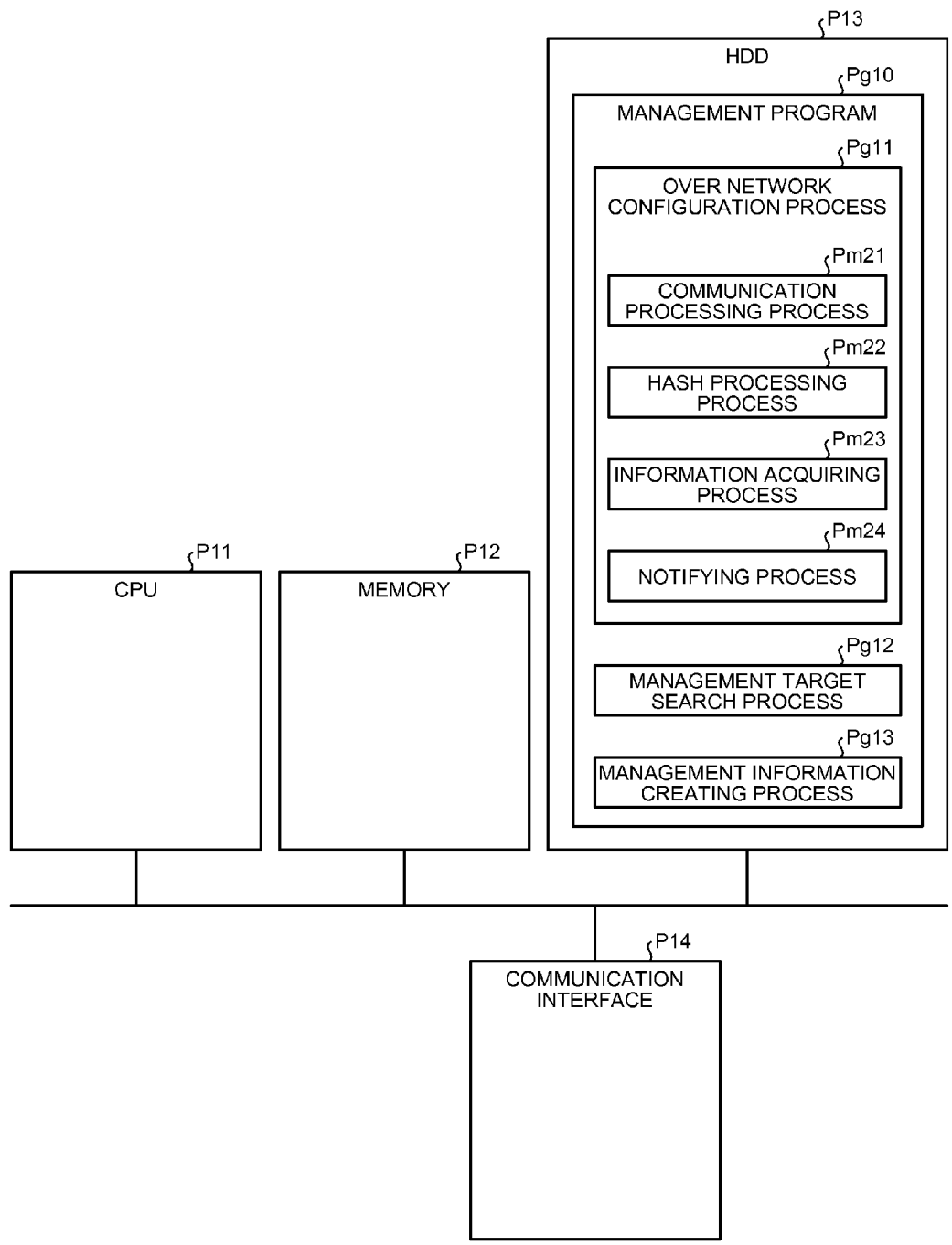
FIG. 5 is a schematic diagram illustrating the relationship between the hardware of a server and the management program.

FIG. 5 is a schematic diagram illustrating the relationship between the hardware of a server and the management program. A management program Pg10 is stored in a hard disk drive (HDD) P13 in a server. The management program Pg10 includes an over network configuration process Pg11 in which the operation of an overlay network constructing unit is described, a management target search process Pg12 in which the operation of a management target searching unit is described, and a management information creating process Pg13 in which the operation of a management information creating unit is described.

When a server boots up, the management program Pg10 is read from the HDD P13 and is loaded in a memory P12. Then, a central processing unit (CPU) P11 sequentially executes the program loaded in the memory, thus allowing the server to function as a management device. At this point, a communication interface P14 of a server is used as an interface of the management device in the overlay network.

Figure 6:
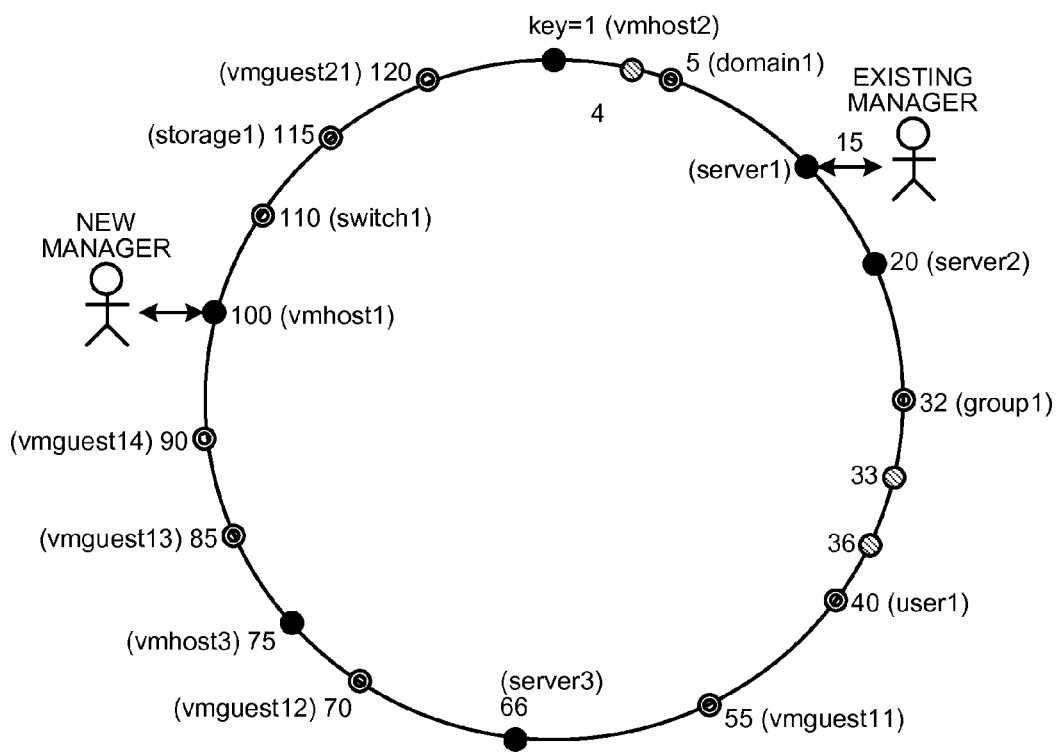
FIG. 6 is a schematic diagram illustrating an overlay network.

FIG. 6 is a schematic diagram illustrating an overlay network. After the booting up, the management device or a management program forms an overlay network. For example, if the overlay network constructing unit m11 uses the Chord algorithm with a distributed hash table (DHT), the ring-based overlay network illustrated in FIG. 6 is formed.

In the DHT, a pair made up of a key and a value is distributed and retained in each node that participates in the overlay network. In the Chord algorithm, a value hashed using a secure hash algorithm (SHA)−1 is used as a key and each key is stored in a node that has a key value greater than the hashed key value and that is a first node in which a management program is running.

In the example illustrated in FIG. 6, The key of vmhost 2 is 1, the key of domain1 is 5, the key of server 1 is 15, the key of server2 is 20, the key of group 1 is 32, the key of user 1 is 40, and the key of vmguest 11 is 55. Similarly, the key of server 3 is 66, the key of vmguest 12 is 70, the key of vmhost 3 is 75, the key of vmguest 13 is 85, and the key of vmguest 14 is 90. Furthermore, the key of vmhost 1 is 100, the key of switch 1 is 110, the key of storage 1 is 115, and the key of vmguest 21 is 120.

At this point, the vmhosts 1 to 3 and the servers 1 to 3 are nodes that belong to the domain1 and are nodes in which a management program has been executed, all of which are represented by the black circle in FIG. 6. Furthermore, vmguet, storage, a switch, and the like that belong to the domain 1 are represented by the double circle in FIG. 6. Furthermore, in FIG. 6, the node (the node having a key of 4, 33, or 36) belonging to the domain 2 is represented by the shaded circle.

As described above, a pair made up of a key and a value is stored in a node that has a key value greater than the hashed key value and that is a first node in which a management program is running; therefore, the keys 40 and 55 are stored in a node whose key value is 66.

Furthermore, in the Chord algorithm, each node has, as routing information, information on an immediately previous node, on an immediately subsequent node, and on a node of (subject node key+2^(x−1)) mod(2^k), where x is a natural number from 1 to k and k is the number of bits of a key. Specifically, each node has information on nodes scattered in this way: 1, 2, 4, 8, 16, 32, 64, and 128 . . . .

Accordingly, with the Chord DHT, each node allows a node, which has a key whose value is greater than that of the key of each node and appears for the first time after the each node, to have a value associated with the key. Furthermore, each node can acquire the value that is associated with the key from the first node that has a key whose value is greater than that of the key.

FIG. 7 is a table illustrating a specific example of a definition of a distributed hash table (DHT). This DHT corresponds to a hash table t1 in the SAN illustrated in FIG. 2.

FIG. 7 illustrates the key hashed using the SHA-1 and the value that is associated with the key. Furthermore, in the embodiment, an example is given in which a node name is used as a key; however, the configuration is not limited thereto.

For a server, the server name is hashed by using the SHA-1 and the result thereof is used as a key. The items contained as the values here include the tag "server" that indicates a server, the server name, the key obtained from the server name, the list of IP addresses contained in the server (IP list), the list of WWNs contained in the server (WWN list), the manager-flag indicating whether the server functions as a management node, the domain to which the server belongs, and the key of the domain.

For a VM host, the VM host name is hashed by using the SHA-1 and the result thereof is used as a key. The items contained as the values here includes the tag "vmhost" that indicates a VM host, the VM host name, the key obtained from the VM host name, the IP list of the VM hosts, the domain to which the VM host belongs, the list of domain keys, and the list of VM guests running on the VM host.

For a VM guest, the VM guest name is hashed by using the SHA-1 and the result thereof is used as a key. The items contained as the values here includes the tag "vmguest" that indicates a VM host, the VM guest name, the key obtained from the VM guest name, the IP list of the VM guests, and the name and key of the VM host on which the VM guest is operating.

For a switch, the switch name is hashed by using the SHA-1 and the result thereof is used as a key. The items contained as the values here includes the tag "switch" that indicates a switch, the switch name, the key obtained from the switch name, the IP list of the switches, the domain to which the switch belongs, and the list of domain keys.

For storage, the storage name is hashed by using the SHA-1 and the result thereof is used as a key. The items contained as the values here includes the tag "storage" that indicates storage, the storage name, the key obtained from the storage name, the IP list of storage, the WWN list of storage, the domain to which the storage belongs, and the list of domain keys.

For a user, the user name is hashed by using the SHA-1 and the result thereof is used as a key. The items contained as the values here include the tag "user" that indicates a user, the user name, the key obtained from the user name, the group name to which the user belongs, and the list of group keys.

For a group, the group name is hashed by using the SHA-1 and the result thereof is used as a key. The items contained as the values here includes the tag "group" that indicates a group, the group name, the key obtained from the group name, the name of the user belonging to the group, and the list of keys.

For a domain, the domain name is hashed by using the SHA-1 and the result thereof is used as a key. The items contained as the values here include the tag "domain" that indicates a domain, the domain name, the key obtained from the domain name, and the list of the keys of the management devices in the domain.

FIG. 8 is a table illustrating a specific example of the self node table t2 illustrated in FIG. 2. The self node table is a table in which information is registered. Examples of the information include a node of a server in which a management program is running, i.e., the server itself, a VM host running on the server, and a VM guest. FIG. 8 illustrates a self node table that is created by the management program running on, in addition to the vmguests 11 to 14, the vmhost 1. The self node table contains items of the type, the node name, the key, the IP address, and the WWN.

In the example illustrated in FIG. 8, an entry is registered, in which the type is vmhost, the node name is vmhost1.domain1.company.com, the key is 100, the IP address is 10.20.30.40, and the WWN is 10:00:00:60:69:00:23:74. Furthermore, an entry is registered, in which the type is vmguest, the node name is vmguest11.domain1.company.com, the key is 55, the IP address is 10.20.30.41, and the WWN is null.

Similarly, an entry is registered, in which the type is vmguest, the node name is vmguest12.domain1.company.com, the key is 70, the IP address is 10.20.30.42, and the WWN is null. Furthermore, an entry is registered, in which the type is vmguest, the node name is vmguest13.domain1.company.com, the key is 85, the IP address is 10.20.30.43, and the WWN is null. Furthermore, an entry is registered, in which the type is vmguest, the node name is vmguest14.domain1.company.com, the key is 90, the IP address is 10.20.30.44, and the WWN is null.

FIG. 9 is a table illustrating a specific example of the domain table t3 illustrated in FIG. 2. Each of the management devices or the management programs obtains a key by hashing, using the SHA-1, the domain name of the domain to which a subject node belongs and registers the result thereof in the domain table t3. Furthermore, in the domain table t3, in addition to the domain name and the keys of the domain, a key of the manager that manages the domain is registered. A node in which a management program is running can be managed by an arbitrary node as a manager and multiple managers may also be present in the domain.

FIG. 10 is a table illustrating a specific example of the node management table t4 illustrated in FIG. 2. The node management table t4 contains management information created by the management program or the management device that acts as a manager that manages a node in a domain and is information on all the nodes belonging to the same domain as that of a subject node.

The node management table t4 illustrated in FIG. 10 is a table created and retained by the manager that manages the domain 1 in the overlay network illustrated in FIG. 6.

The node management table t4 illustrated in FIG. 10 includes items such as the type, the node name, the key, the domain key, a manager flag, and a managed flag. The manager flag takes, as a value, true if the corresponding node is a manager and false if the corresponding node is not a manager. The managed flag takes, as a value, true if the corresponding node is being managed and false if the corresponding node is not being managed.

Specifically, the node management table t4 illustrated in FIG. 10 has an entry in which the type is vmhost, the node name is vmhost2.domain1.company.com, the key is 1, the domain key is 5, the manager flag is false, and the managed flag is true.

Furthermore, the node management table t4 has an entry in which the type is a server, the node name is server1.domain1.company.com, the key is 15, the domain key is 5, the manager flag is true, and the managed flag is true.

Furthermore, the node management table t4 has an entry in which the type is a server, the node name is server2.domain1.company.com, the key is 20, the domain key is 5, the manager flag is false, and the managed flag is true.

Furthermore, the node management table t4 has an entry in which the type is vmguest, the node name is vmguest11.domain1.company.com, the key is 55, the domain key is 5, the manager flag is false, and the managed flag is true.

Furthermore, the node management table t4 has an entry in which the type is a server, the node name is server3.domain1.company.com, the key is 66, the domain key is 5, the manager flag is false, and the managed flag is true.

Furthermore, the node management table t4 has an entry in which the type is vmguest, the node name is vmguest12.domain1.company.com, the key is 70, the domain key is 5, the manager flag is false, and the managed flag is true.

Furthermore, the node management table t4 has an entry in which the type is vmhost, the node name is vmhost3.domain1.company.com, the key is 75, the domain key is 5, the manager flag is false, and the managed flag is true.

Furthermore, the node management table t4 has an entry in which the type is vmguest, the node name is vmguest13.domain1.company.com, the key is 85, the domain key is 5, the manager flag is false, and the managed flag is true.

Furthermore, the node management table t4 has an entry in which the type is vmguest, the node name is vmguest14.domain1.company.com, the key is 90, the domain key is 5, the manager flag is false, and the managed flag is true.

Furthermore, the node management table t4 has an entry in which the type is vmhost, the node name is vmhost1.domain1.company.com, the key is 100, the domain key is 5, the manager flag is true, and the managed flag is true.

Furthermore, the node management table t4 has an entry in which the type is switch, the node name is switch1.domain1.company.com, the key is 110, the domain key is 5, the manager flag is false, and the managed flag is true.

Furthermore, the node management table t4 has an entry in which the type is storage, the node name is storage1.domain1.company.com, the key is 115, the domain key is 5, the manager flag is false, and the managed flag is true.

Furthermore, the node management table t4 has an entry in which the type is vmguest, the node name is vmguest21.domain1.company.com, the key is 120, the domain key is 5, the manager flag is false, and the managed flag is true.

As described above, because the node management table t4 is the table that manages nodes that belong to the domain 1, the nodes belonging to the domain 2 are not registered in the node management table t4.

FIG. 11 is a table illustrating a specific example of the routing table t5, which is also illustrated in FIG. 2. The routing table t5 is a table that is used by each management device or management program for the routing in the overlay network.

In the example illustrated in FIG. 11, the routing table t5 contains items, such as the distance that indicates the key of the destination, the node name of the destination, the destination key that is the routing destination key used when communicating with the destination, and destination IP that is the IP address of the routing destination.

FIG. 11 is a table illustrating a specific example of a routing table used by the node that has the key of 100. The routing table t5 illustrated in FIG. 11 contains items in which the distance is 1, the node name is vmhost1.domain1.company.com, the destination key is 1, the destination IP is a1.b1.c1.d1, the distance is 2, the node name is vmhost2.domain1.company.com, and the destination key is 1, the destination IP is a1.b1.c1.d1.

Furthermore, the routing table t5 contains items in which the distance is 3, the node name is vmhost2.domain1.company.com, the destination key is 1, and the destination IP is a1.b1.c1.d1.

Furthermore, the routing table t5 contains items in which the distance is 5, the node name is vmhost2.domain1.company.com, the destination key is 1, and the destination IP is a1.b1.c1.d1.

Furthermore, the routing table t5 contains items in which the distance is 9, the node name is vmhost2.domain1.company.com, the destination key is 1, and the destination IP is a1.b1.c1.d1.

Furthermore, the routing table t5 contains items in which the distance is 17, the node name is vmhost2.domain1.company.com, the destination key is 1, and the destination IP is a1.b1.c1.d1.

Furthermore, the routing table t5 contains items in which the distance is 33, the node name is node1.domain2.company.com, the destination key is 4, and the destination IP is a4.b4.c4.d4.

Furthermore, the routing table t5 contains items in which the distance is 65, the node name is node3.domain2.company.com, the destination key is 36, and the destination IP is a36.b36.c36.d36.

As described above, if nodes (key: 1, 2, 3, 5, 9, and 17) belonging to the domain 1 are the destinations, the routing table t5 specifies that the nodes are routed to the Key 1 (IP address: a1.b1.c1.d1). Furthermore, if the node key 33 belonging to the domain 1 is the destination, the routing table t5 specifies that the node is routed to the key 4, whose IP address is a4.b4.c4.d4, and, if the node key of 65 belonging to the domain 2 is the destination, the routing table t5 specifies that the node is routed to the key 36, whose IP address is a36.b36.c36.d36.

Figure 12:
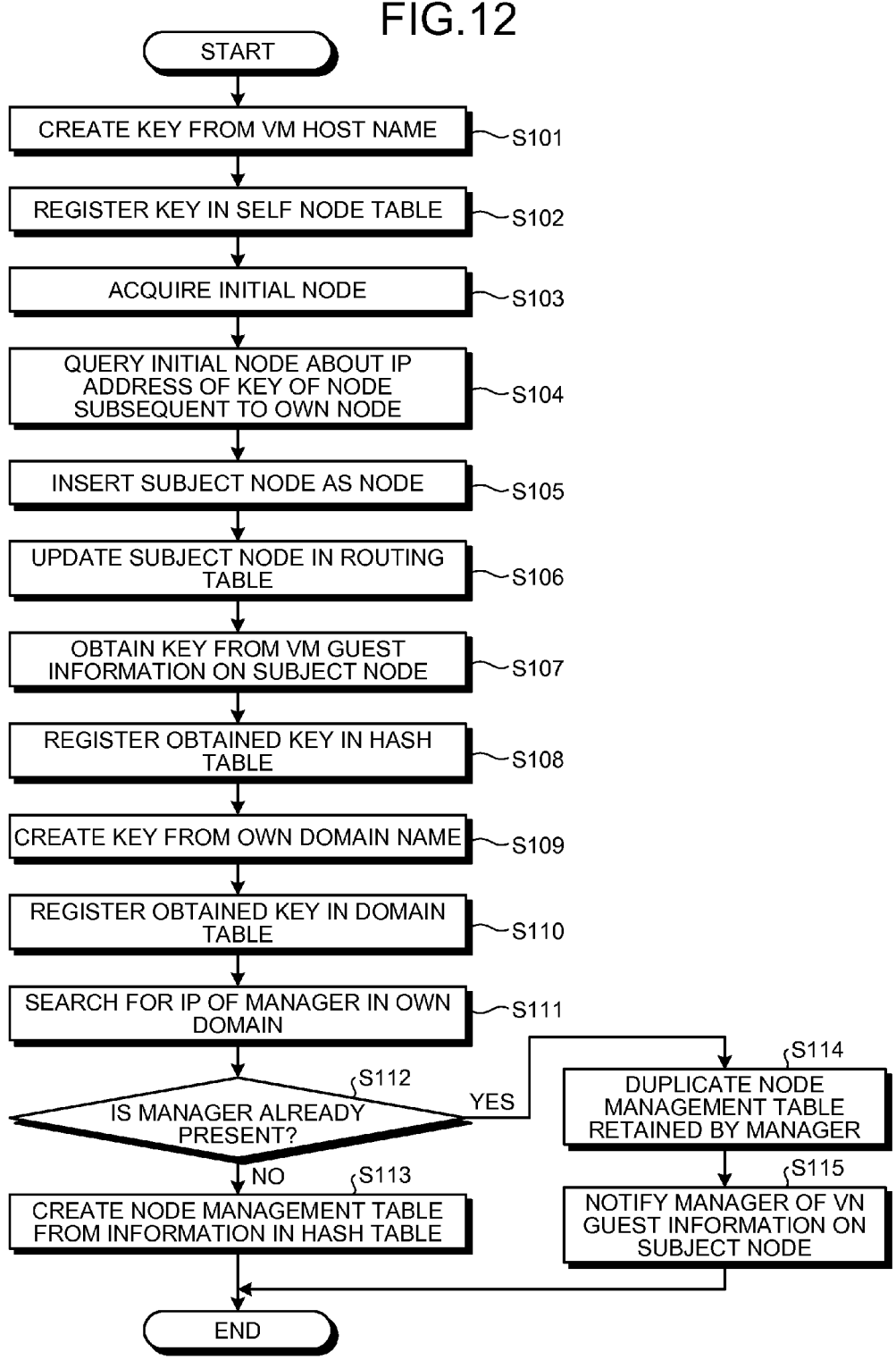
FIG. 12 is a flowchart illustrating the flow of a process in which the management program is installed in a VM host and is connected to an existing overlay network.

FIG. 12 is a flowchart illustrating the flow of a process in which the management program is installed in a VM host and is connected to an existing overlay network.

When a management program is installed, a hash processing process Pm22 creates, using the hash function (SHA-1, if the Chord algorithm is used), a key from the VM host name (vmhost1.domain1.company.com) (Step S101) and stores the created key in the self node table t2 (Step S102). In the embodiment, to simplify the explanation, a node name is used for data to be hashed; however, the embodiment is not limited thereto.

It is assumed that the created key is 100, which is as illustrated in FIG. 6. In a case of SHA-1, in practice, the key is 90:d5:3e:4d:77:2c:3f:54:c3:49:a9:44:00:b3:e2:b5:08:d9:cd:6d.

Then, a communication processing process Pm21 acquires an initial node, i.e., a node that has already participated in the overlay network (Step S103). The initial node is acquired from, for example, a Web server that is always running. In this case, the IP address of the acquired initial node is the host of the key 20.

The communication processing process Pm21 queries the initial node and acquires an IP address of the key 1 of the node that is subsequent to a subject node key (Step S104). Then, the communication processing process Pm21 queries the node having the key 1, acquires the IP address of the node having the key 75 immediately previous to the subject node, inserts the subject node (a new manager illustrated in FIG. 6) between the key 75 and the key 1 (Step S105), and updates the subject node in the routing table t5 (Step S106).

The hash processing process Pm22 obtains keys from four pieces of VM guest information running on the VM host on the subject node (Step S107) and registers the obtained keys 55, 70, 85, and 90 in the hash table t1 (Step S108). Furthermore, the hash processing process Pm22 creates a key from an own domain name (domain1.company.com) (Step S109), obtains the domain information from the hash table t1, and stores it in the domain table t3 (Step S110).

Then, the management target search process pm12 acquires information on the IP address (the existing manager illustrated in FIG. 6) of the manager belonging to the own domain (Step S111). If no manager belonging to the own domain is present (No at Step S112), the management information creating process pm13 constructs configuration information from the information registered in the hash table t1, stores the configuration information as the node management table t4 (Step S113), and ends the process.

In contrast, if the manager belonging to the own domain is already present (Yes at Step S112), the management information creating process pm13 duplicates the node management table retained by the existing manager in the own domain and uses it as the node management table t4 (Step S114). Then, the management information creating process pm13 notifies the existing manager that belongs to the own domain of the four pieces of VM guest information (Key 55, 70, 85, and 90) in the subject node (Step S115), and ends the process.

With the above described process, configuration information on a single VM host (a new manager illustrated in FIG. 6) and four pieces of VM guest information (Key 55, 70, 85, and 90), which are newly added as the target for management, are automatically registered. Furthermore, in the existing manager belonging to the own domain, it is possible to determine whether a newly added target for management is managed.

As described above, with the management device, the management program, and the management method according to the embodiment, by installing an operation management program in the node targeted for management and starting a program, the installation settings are automatically started and thus the creation of the node management table, i.e., the management information, is completed. This makes it possible to reduce the time and effort to construct the configuration information and configure the installation settings, thus easily starting network management.

The management device, a management program, and a management method disclosed in the present invention, it is possible to easily start the management of a network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A management device that manages an overlay network built on a network, wherein
    management devices, belonging to the same domain, function as nodes of the overlay network,
    key information for a predetermined space corresponding to the overlay network is associated with each of the management devices, and
    the management device includes a memory and a processor coupled to the memory, wherein the processor executes a process comprising:
        calculating first key information corresponding to the management device that is a first node of the overlay network;

acquiring, from a predetermined node in the overlay network, an IP address of a second node corresponding to the a second key information that is determined by the first key information in the predetermined space;

acquiring, by accessing the second node based on the IP address of the second node, an IP address of a third node corresponding to a third key information that is determined by the first key information in the present space;

inserting the first key information between the second key information and the third key information; and updating, based on the IP addresses of the second node and the third node, key information corresponding to a destination node that communicates with the first node in the overlay network, a node name of the destination node, key information corresponding to a routing node that routs communication of the first node with the destination node, and an IP address of the routing node.

2. The management device according to claim 1, wherein the processor further executes the process comprising:

calculating hash values of a host and a guest of a virtual machine as the key information;

registering, in a hash table, node names of the host and the guest, and key information calculated associated with IP addresses of the nodes;

searching an IP address of a management device running on the node belonging to the same domain in the overlay network;

acquiring management information of the overlay network when the management device is searched at the searching; and creating management information of the overlay network based on the hash value of the first node when the management device is not searched.

3. The management device according to claim 1, wherein the processor further executes the process comprising:

calculating hash values of a host and a guest of a virtual machine as the key information;

registering, in a hash table, node names of the host and the guest, and key information calculated associated with IP addresses of the nodes;

calculating, as the key information, hash values of the same domain to which the first node belongs;

registering, in a hash table, the key information calculated associated with the key information of the node, belonging to the same domain, on which the management device runs; and notifying the management device to add the management information of the overlay network based on the hash value of the first node to the management information of the overlay network managed by the management device.

4. A non-transitory computer readable recording medium having stored therein a management program causing a computer, which is a node in an overlay network targeted for management, nodes of the overlay network targeted for management belonging to the same domain, key information for a predetermined space corresponding to the overlay network being associated with each of the nodes, to execute a process comprising:

calculating first key information corresponding to the management device that is a first node of the overlay network;

acquiring, from a predetermined node in the overlay network, an IP address of a second node corresponding to the a second key information that is determined by the first key information in the predetermined space;

acquiring, by accessing the second node based on the IP address of the second node, an IP address of a third node corresponding to a third key information that is determined by the first key information in the present space;

inserting the first key information between the second key information and the third key information; and updating, based on the IP addresses of the second node and the third node, key information corresponding to a destination node that communicates with the first node in the overlay network, a node name of the destination node, key information corresponding to a routing node that routs communication of the first node with the destination node, and an IP address of the routing node.

5. A management method executed by a management device, wherein management devices, belonging to the same domain, function as nodes of the overlay network, key information for a predetermined space corresponding to the overlay network is associated with each of the management devices, and the management device executes the process comprising:

calculating first key information corresponding to the management device that is a first node of the overlay network;

acquiring, from a predetermined node in the overlay network, an IP address of a second node corresponding to the a second key information that is determined by the first key information in the predetermined space;

acquiring, by accessing the second node based on the IP address of the second node, an IP address of a third node corresponding to a third key information that is determined by the first key information in the present space;

inserting the first key information between the second key information and the third key information; and updating, based on the IP addresses of the second node and the third node, key information corresponding to a destination node that communicates with the first node in the overlay network, a node name of the destination node, key information corresponding to a routing node that routs communication of the first node with the destination node, and an IP address of the routing node.

* * * * *